United States Patent
Yoshida et al.

(10) Patent No.: US 7,474,610 B2
(45) Date of Patent: Jan. 6, 2009

(54) OFDM AUTOMATIC FREQUENCY CONTROL DEVICE AND METHOD THEREOF

(75) Inventors: Makoto Yoshida, Kawasaki (JP); Tetsuya Yano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 761 days.

(21) Appl. No.: 10/799,937

(22) Filed: Mar. 11, 2004

(65) Prior Publication Data

US 2004/0174811 A1    Sep. 9, 2004

Related U.S. Application Data

(63) Continuation of application No. PCT/JP01/08542, filed on Sep. 28, 2001.

(51) Int. Cl.
*H04J 9/00* (2006.01)
*H04L 5/04* (2006.01)

(52) U.S. Cl. .................. 370/204; 370/203; 370/205; 370/207; 370/208; 375/355; 375/357; 375/343

(58) Field of Classification Search ................. None
See application file for complete search history.

(56) References Cited

U.S. PATENT DOCUMENTS

| | | | | |
|---|---|---|---|---|
| 5,812,523 | A * | 9/1998 | Isaksson et al. | 370/208 |
| 7,058,151 | B1 * | 6/2006 | Kim | 375/355 |
| 2002/0017948 | A1 * | 2/2002 | Hyakudai et al. | 329/304 |
| 2003/0063678 | A1 * | 4/2003 | Crawford | 375/260 |

FOREIGN PATENT DOCUMENTS

| | | |
|---|---|---|
| JP | 7-74726 | 3/1995 |
| JP | 9-8702 | 1/1997 |
| JP | 10-117178 | 5/1998 |
| JP | 10-322305 | 12/1998 |
| JP | 2001-237803 | 8/2001 |

OTHER PUBLICATIONS

Preliminary Examination Report.
Shinsuke Hara, et al. Overview of Multicarrier CDMA. IEEE Communications Magazine Dec. 1997, pp. 126-133.
Sadayuki Abeta, et al. Performance of Coherent Multi-Carrier/DS-CDMA and MC-CDMA for Broadband Packet Wireless Access. IEICE Trans Commun., Mar. 2001, pp. 406-414, vol. E84-B, No. 3.
International Preliminary Examination Report Dated May 1, 2002.

* cited by examiner

*Primary Examiner*—Chi H Pham
*Assistant Examiner*—Raj K Jain
(74) *Attorney, Agent, or Firm*—Katten Muchin Rosenman LLP

(57) ABSTRACT

An OFDM frequency control device converts an incoming signal from analog to digital and calculates a correlation value between the guard interval and data part from which the guard interval is copied, of the A/D converted incoming signal. Then, the device averages such correlation values for the first frame through a plurality of frames and detects the peak of the averaged correlation value. Then, by detecting the phase of the peak position, the device generates the control signal for an oscillator. The control signal is set in such a way that a control amount for each time should be a control step $\alpha$ and is applied to the oscillator. Furthermore, $\alpha$ is appropriately controlled based on detected information.

20 Claims, 15 Drawing Sheets

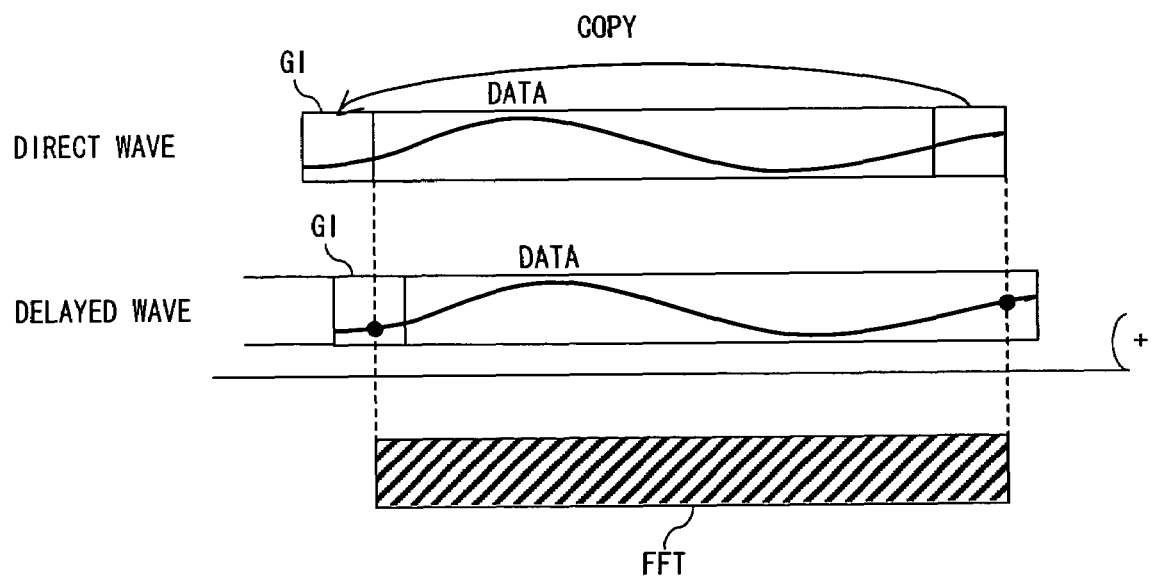
F I G. 4

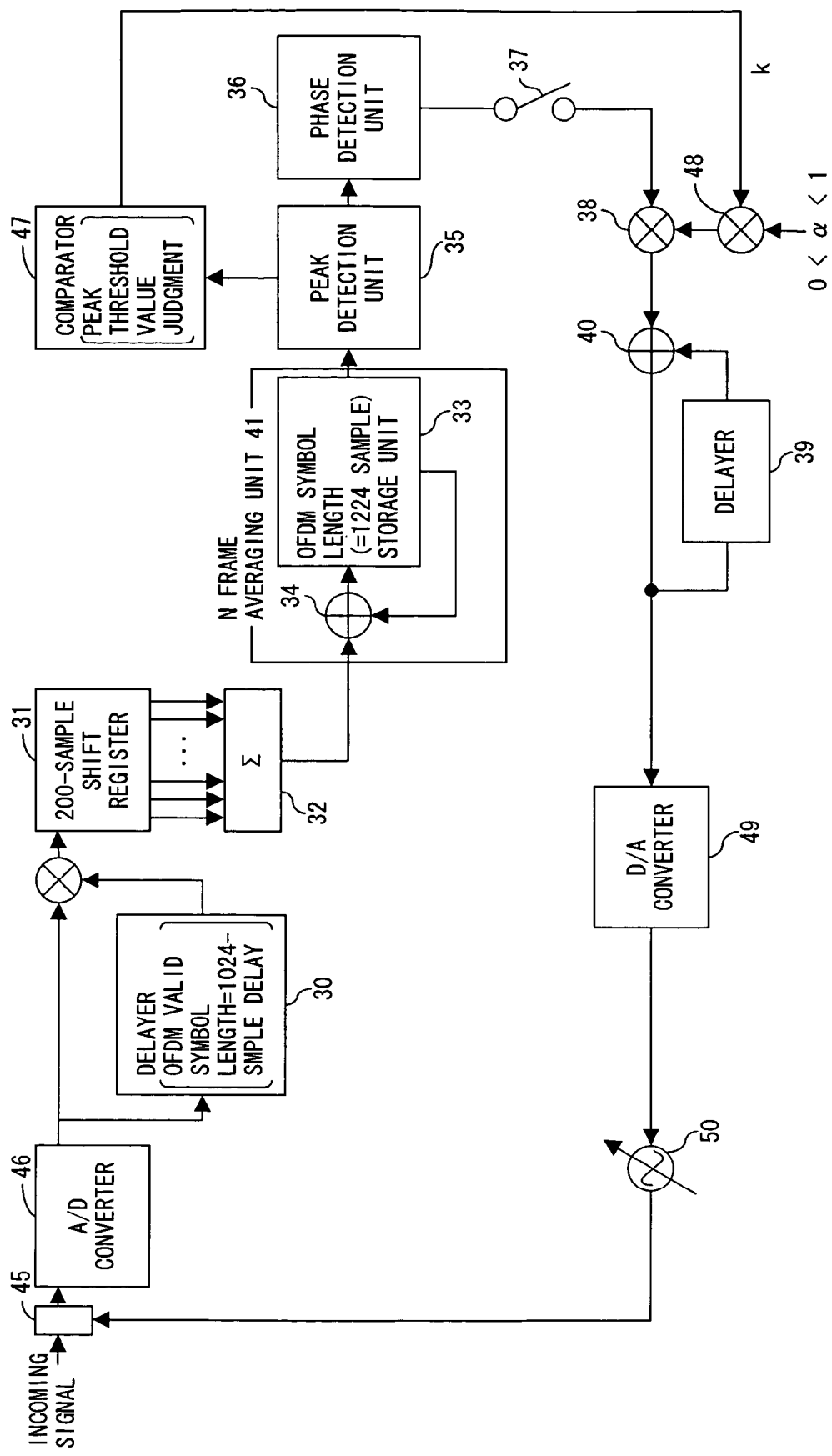
F I G. 6

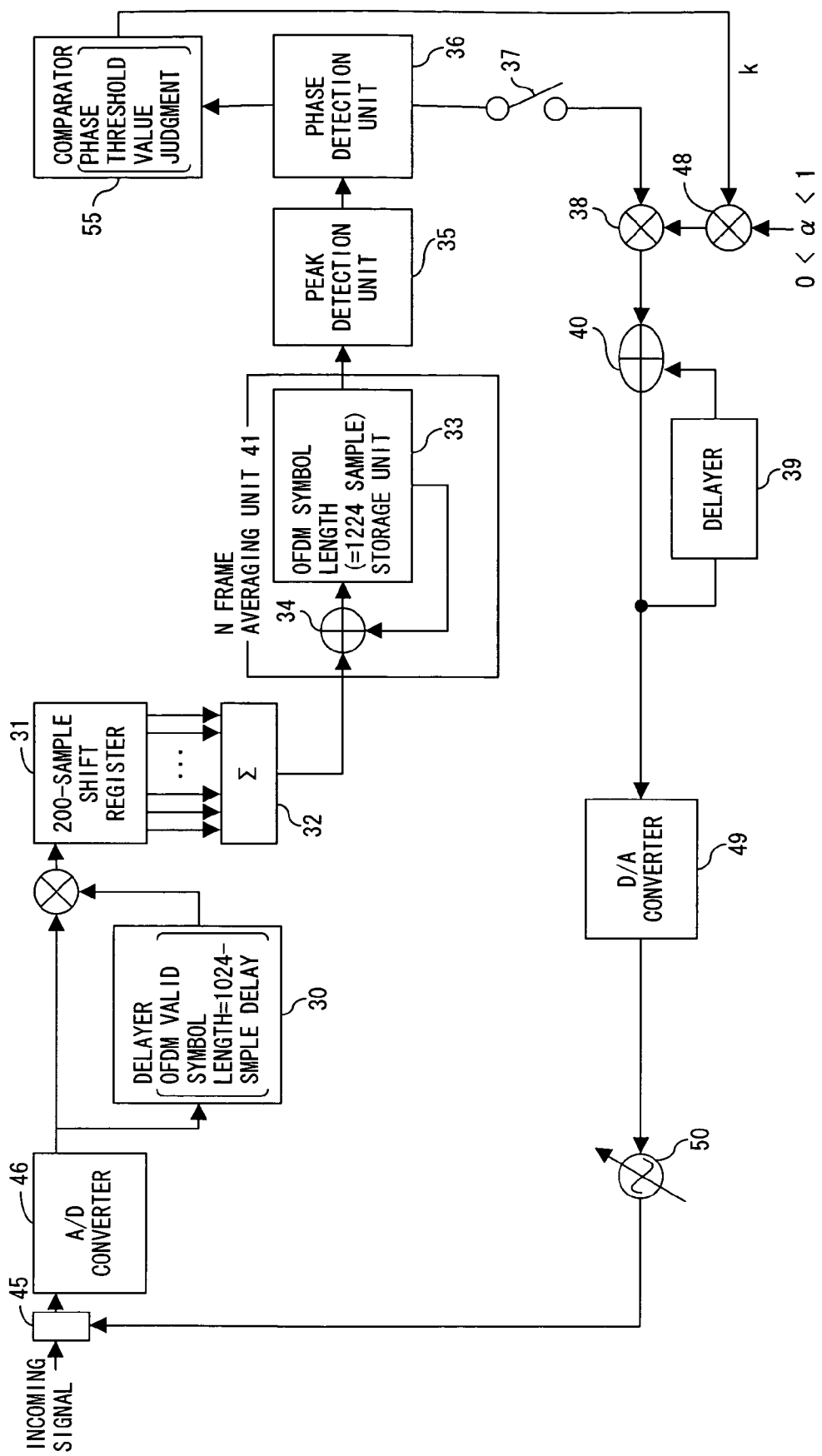
F I G. 7

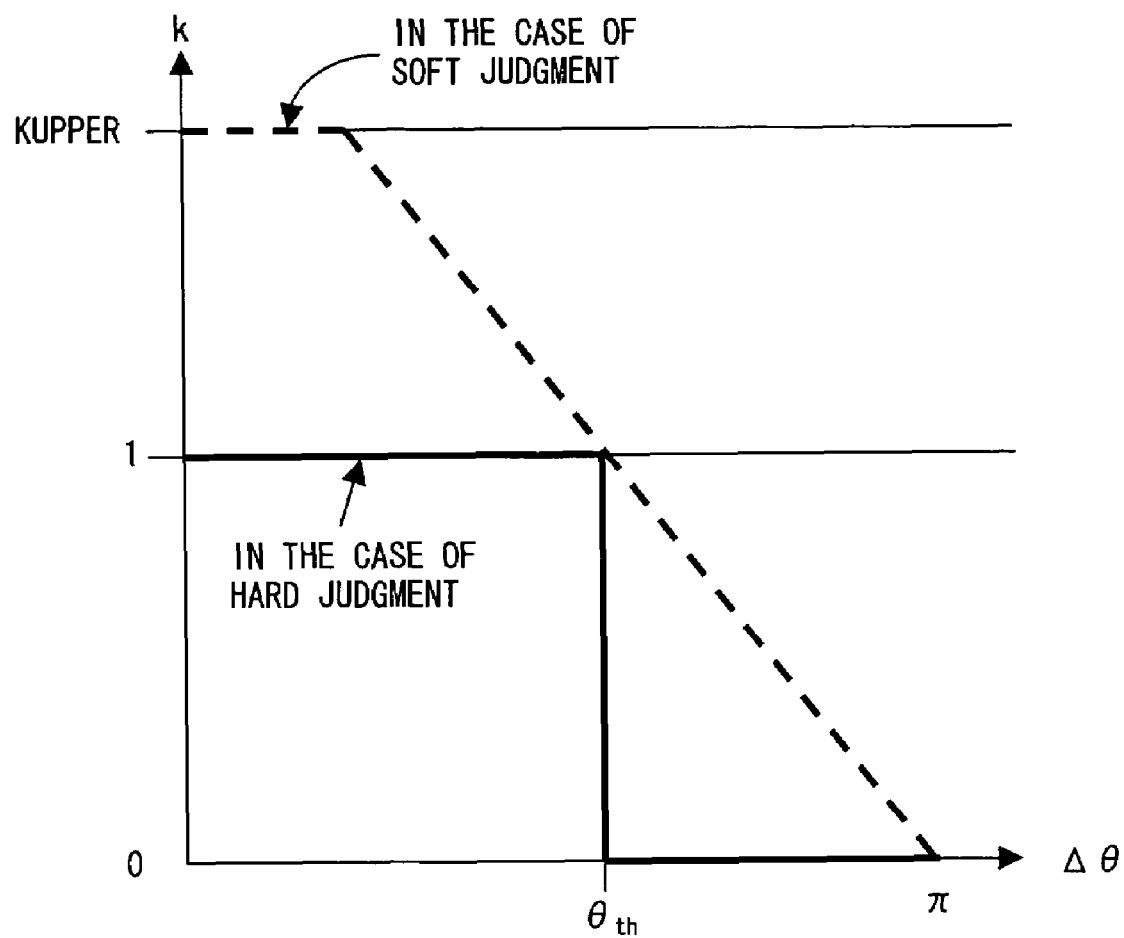
F I G. 1 2

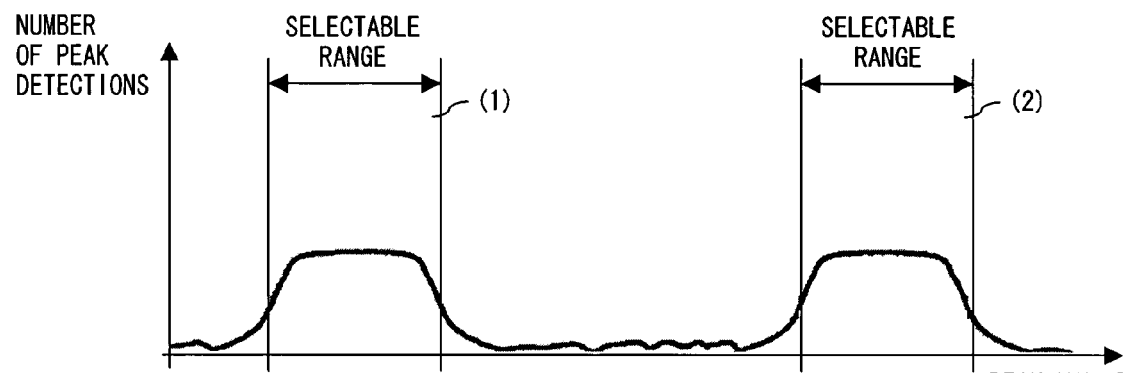
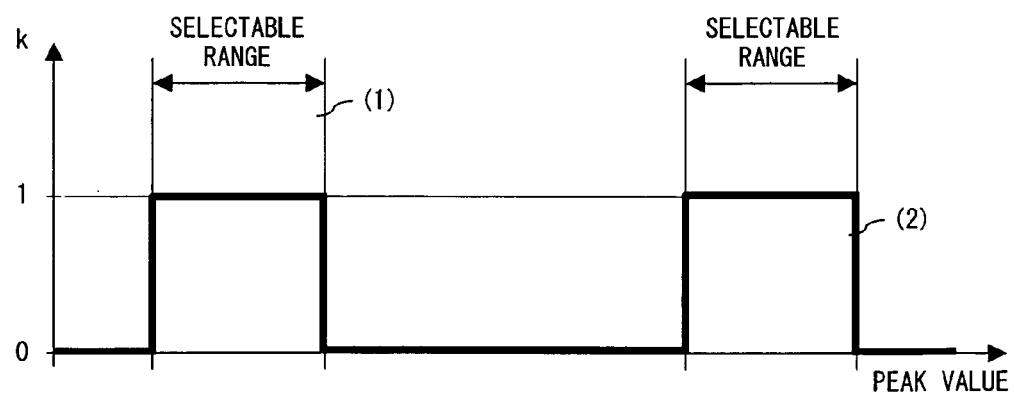
FIG. 13

OFDM AUTOMATIC FREQUENCY CONTROL DEVICE AND METHOD THEREOF

CROSS REFERENCE TO RELATED APPLICATION

This application is a continuation of and claims priority under 35 U.S.C. § 120 from International PCT application Ser. No. PCT/JP01/08542 filed on Sep. 28, 2001.

BACKGROUND OF THE INVENTION

1. Field of the Invention

The present invention relates to an automatic frequency control device in an OFDM (Orthogonal Frequency Divisional Multiplexing) transmission system and a method thereof.

2. Description of the Related Art

Recent advancements in communication technologies have been remarkable and systems communicating large amounts of data at high speed have been being realized. The phenomenon not only applies to wired communication, but also wireless communication. Specifically, with the spread of mobile terminals, such as cellular phones and the like, research and development has created wireless systems where a large amount of data can be communicated at high speed, and multimedia data, such as dynamic images, voice and the like, can be handled by mobile terminals.

Recently, high-speed wireless communication based on CDMA called "the third generation" has been developed and is about to be put into practical use. In response to this trend, wireless communication R&D departments have started to research and develop the fourth generation wireless communication system aiming at larger-capacity and higher-speed wireless communication.

OFDM-CDMA is a strong candidate for the basic system of the fourth generation mobile communication system. In this system, an OFDM technology for transmitting a plurality of pieces of information in parallel using a plurality of sub-carriers each with a reciprocally orthogonal frequency and a CDMA technology using the orthogonality of a spread code by which user data is multiplied when a plurality of pieces of user data are multiplexed, are united in order to realize larger-capacity, higher-quality and higher-speed communication.

However, currently the OFDM-CDMA system is still in a proposal stage and in an R&D evaluation stage, and individual technologies required for an actual system must still be developed.

In particular, in a system based on multi-carrier transmission, such as an OFDM-CDMA system and the like, it is important to reproduce a prescribed carrier frequency in a receiver. In particular, the control accuracy of a reproduced carrier frequency is very important.

SUMMARY OF THE INVENTION

An object of the present invention is to provide an OFDM automatic frequency control device with an excellent frequency control function and a method thereof.

The automatic frequency control device of the present invention is one in an OFDM (Orthogonal Frequency Divisional Multiplexing) system. The automatic frequency control device comprises correlation means for calculating a correlation value between the guard interval and data of an incoming signal, averaging means for averaging the correlation values across a plurality of symbols and a plurality of frames, peak position detecting means for detecting the peak position of the averaged correlation value and control means for controlling an oscillator using a prescribed step, based on the detected peak position.

The automatic frequency control method of the present invention is OFDM (Orthogonal Frequency Divisional Multiplexing). The automatic frequency control method comprises calculating a correlation value between the guard interval and data of an incoming signal (correlation step), averaging the correlation values across a plurality of symbols and a plurality of frames (averaging step), detecting the peak position of the averaged correlation value (peak position detecting step) and controlling an oscillator using a prescribed step, based on the detected peak position (control execution step).

According to the present invention, in an OFDM system, since the receiver's oscillator can rapidly, efficiently and accurately control the frequency, signals can be received with high-accuracy.

BRIEF DESCRIPTION OF DRAWINGS

FIG. 4 shows a guard interval.

FIG. 6 shows the configuration of an AFC device in the second preferred embodiment of the present invention.

FIG. 7 shows the configuration of an AFC device in the third preferred embodiment of the present invention.

FIG. 12 shows how to judge the threshold value of a peak value and the threshold value of a phase detection value (No. 2).

FIG. 13 shows a selection range that can be used for synchronization capture in an OFDM-CDMA system.

DESCRIPTION OF THE PREFERRED EMBODIMENT

Figure 1:
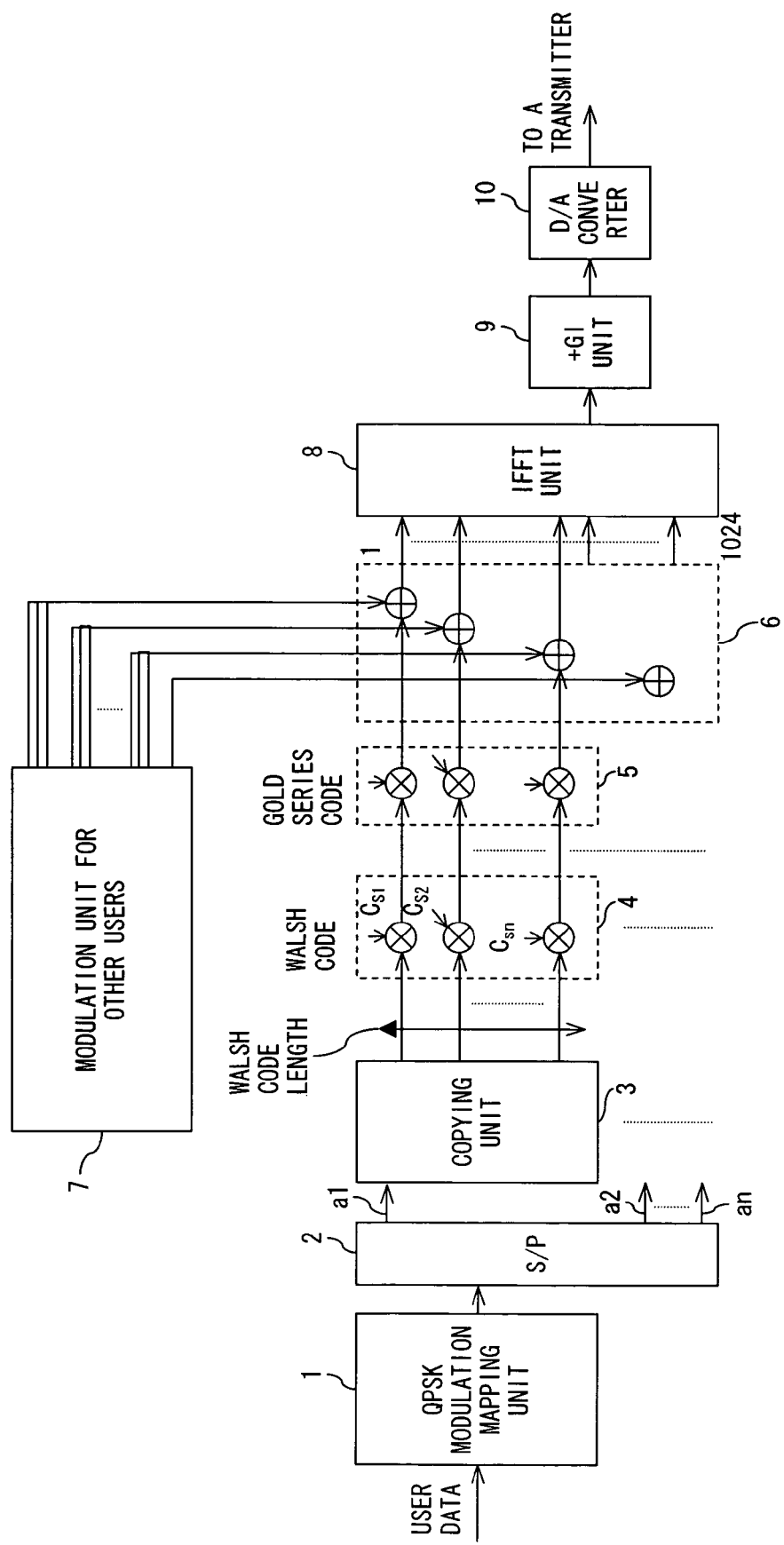
FIG. 1 shows the basic configuration of the transmitter of an OFDM-CDMA system.

FIG. 1 shows the basic configuration of the transmitter of an OFDM-CDMA system.

Input user data is, for example, QPSK-modulated by a QPSK modulation mapping unit 1. This modulation method is one example, and modulation is not necessarily limited to QPSK. The modulated user data is converted from serial into parallel by a serial/parallel converter 2. For example, one symbol of the user data modulated for one time slot is output to the output a1 of the serial/parallel converter 2. Similarly, one symbol of the user data modulated in the same timing is output to the outputs a2 through an of serial/parallel converters 2.

Such sn modulation signal symbols output from the serial/parallel converter 2 thus are copied by a copying unit 3 provided for each output. Then, each of the sn modulation signal symbols is multiplied by each chip of a spread code (in this case, a Walsh code) in a multiplier 4. In this case, the length of a Walsh code equals sn chips. Therefore, each of sn copied modulation signal symbols is multiplied by a different chip of the sn chips of a Walsh code.

Then, each of the modulation signal symbols that are multiplied by such a Walsh code is further multiplied by a spread code (in this case, a Gold series code) in a multiplier 5. Then, a plurality of pieces of other user data transmitted from a modulation unit 7 for other users are modulated. Such signals processed in the same way are added in an adder 6 and are input to an IFFT (Inverse Fast Fourier Transformation) unit 8.

Each signal input to the IFFT unit 8 is regarded to be each frequency component, inverse Fourier transformation is applied to each signal and each signal is output as one modulation wave. Specifically, if the number of inputs to the IFFT unit 8 is 1,024, the number of frequency components is 1,024. Therefore, each frequency component is carried on each of 1,024 sub-carriers. Then, the components are combined and are output from the IFFT unit 8.

The IFFT unit 8 performs Fourier transformation using a sub-carrier with a fundamental frequency and a sub-carrier with a frequency obtained by multiplying the fundamental frequency by an integer. If the frequency of each sub-carrier can be obtained by multiplying the fundamental frequency by an integer, an integration of the product of the sub-carrier with a frequency obtained by multiplying the fundamental frequency by an integer and that with the fundamental frequency for one cycle, becomes 0 and only an integration of the product of sub-carriers with the same frequency for one cycle becomes a finite value. In other words, a sub-carrier with a specific frequency is orthogonal to a sub-carrier with a frequency obtained by multiplying the fundamental frequency by an integer. The word "orthogonal" in OFDM derives from this fact.

Thus, in a guard interval adding unit (+GI unit) 9, a guard interval, which is described later, is added to each signal wave output from the IFFT unit 8, and the signal waves each with a guard interval are transmitted. Up to this point, data are digitally processed. In a D/A converter 10, digital signals are converted into analog signals and transmitted to a transmission side.

Figure 2:
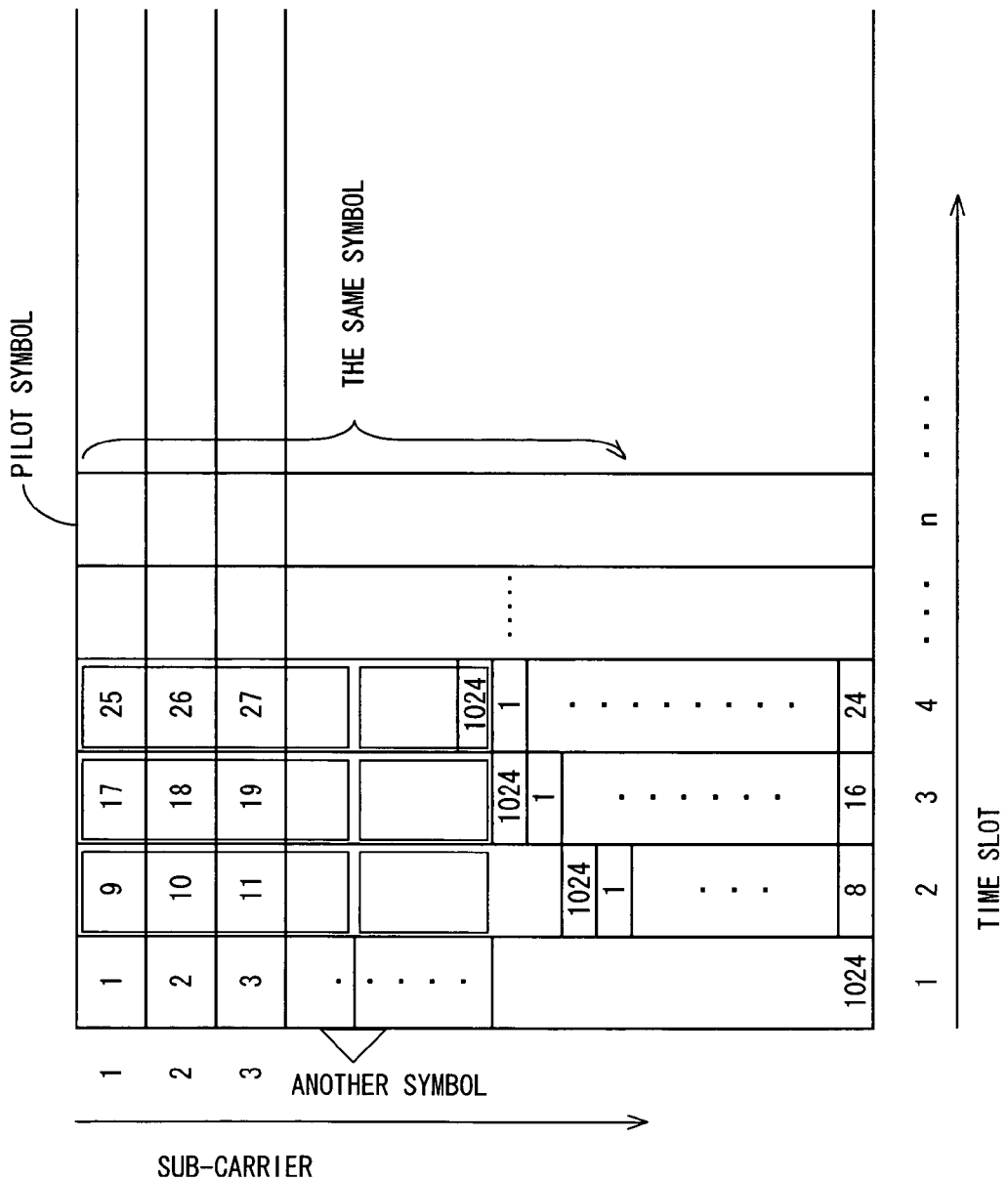
FIG. 2 shows how each modulation signal symbol is allocated in terms of sub-carriers and time slots, being the vertical and horizontal axes, respectively.

FIG. 2 shows how each modulation signal symbol is allocated according to sub-carrier and time slots, being the vertical and horizontal axes, respectively.

A modulation signal is packed into a frame. The frame is composed of at least a data section and a pilot section. In this example, the number of sub-carriers is 1,024. It is assumed that a Walsh code is composed of 32 chips. In this case, if it is assumed that the data section is composed of time slots 1 through 4, in the data unit, one symbol is stored in each of sub-carriers 1 through 32 and another is in sub-carriers 33 through 64 of time slot 1, etc., and one time slot accommodates 32 (=1,024/32) symbols.

Although a subsequent time slot 2 accommodates symbols similarly, the multiplication methods of a Wash code and a Gold series code are different from those of time slot 1. Specifically, 1,042 chips of a code is generated by combining Walsh codes with Gold series codes. Then, for example, as shown in FIG. 2, in time slot 2, symbols are multiplied after a generated code is shifted by eight chips. In time slot 3, symbols are multiplied after the generated code is shifted by eight more chips. In time slot 4, symbols are multiplied after the generated code is shifted by another eight more chips. Thus, the multiplication timing of a spread code is shifted eight chips.

So far, the relation between the symbol array and spread codes in a data section has been described. The pilot section has a different structure from that of the data section. For example, if a time slot n accommodates one symbol of the pilot section, this pilot symbol is commonly accommodated for 1,024 sub-carriers. Although one frame accommodates, for example, four pilot symbols, which is described later, each symbol is multiplied in the same way. The Walsh code multiplication method of the pilot section is different from that of the data section, which is described later.

Figure 3:
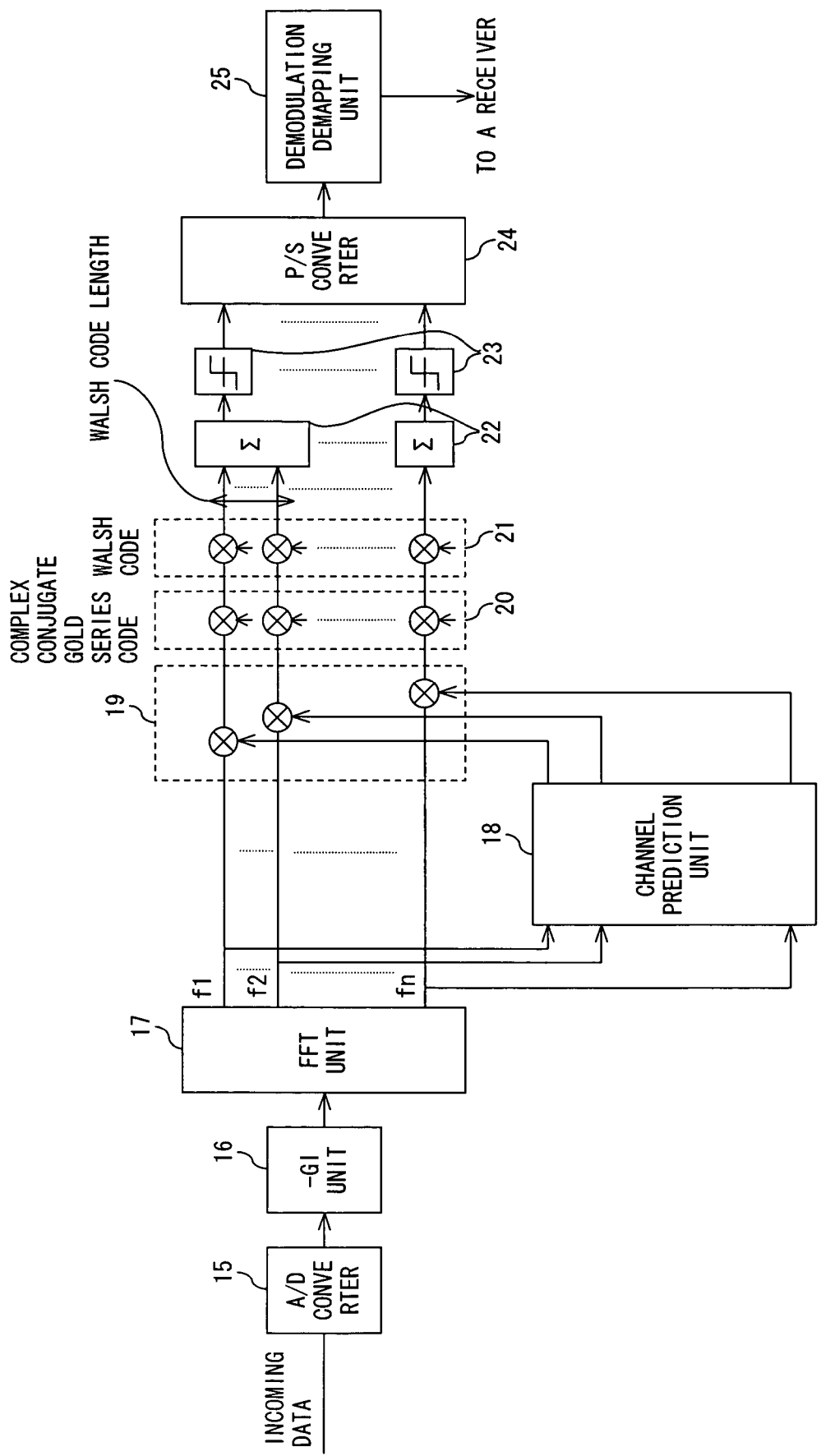
FIG. 3 shows the basic configuration of the receiver of an OFDM-CDMA system.

FIG. 3 shows the basic configuration of the receiver of an OFDM-CDMA system.

Incoming data is first converted into digital signals by an A/D converter 15. Then, in a guard interval eliminating unit (−GI unit) 16, guard intervals are eliminated, and the resulting digital signals are input to an FFT (Fast Fourier Transformation) unit 17. The FFT unit 17 decomposes a signal wave for a specific time period into its frequency components by Fourier transformation. Specifically, although in a transmitter, the modulation signal symbol of user data is regarded to be frequency components and is converted into a signal wave for a specific time period by inverse-Fourier transformation, in the FFT unit 17, frequency components are extracted from a signal wave for a specific time period by Fourier transformation. That is, in this case, the modulation signal symbol of user data is extracted.

The modulation signal symbol of the pilot section of the frequency components f1 through fn obtained by the process of the FFT unit 17 is used to calculate a channel prediction in a channel prediction unit 18. In a channel compensation unit 19, the channel of each of the frequency components f1 through fn is compensated for. Then, in a multiplier 20, each of the frequency components f1 through fn is multiplied by the complex conjugate of the Gold series code used on a transmitting side. Then, in a multiplier 21, each of the frequency components f1 through fn is multiplied by a Walsh code. In this stage, the modulation signal symbol of the user data is demodulated, signals including one symbol are added in an adder 22, and the value of the symbol is judged by a symbol judger 23. Then, the judged symbol value is converted from parallel to serial by a parallel/serial converter 24 and is input to a demodulation demapping unit 25. In the demodulation demapping unit 25, the user data modulated by the transmitter is demodulated and extracted. Then, the user data is transmitted to a receiving unit.

FIG. 4 shows a guard interval.

The top section of data of a prescribed length is copied and attached to the end section of a data transmitted from a transmitter as a guard interval (GI). The length of the guard interval is determined in such a way that the delay of a wave that has been delayed due to multi-path and the like and reaches a receiver can be accommodated in this guard interval.

The reason why such a guard interval is provided is as follows.

Specifically, data and a guard interval are carried and transmitted on a plurality of sub-carriers. However, if attention is focused onto one sub-carrier, data to which Fourier transformation has been applied once is accommodated in one cycle of a sub-carrier with the fundamental frequency or in a cycle of a sub-carrier with a frequency obtained by multiplying the fundamental frequency by an integer. In Fourier transformation, if each frequency component is extracted, the fact that in one cycle of the fundamental frequency, sub-carriers are orthogonal to one another, is used. Therefore, in order to correctly extract each frequency component, the data of a received signal to which Fourier transformation is applied must be carried in a cycle of a sub-carrier with a frequency obtained by multiplying the fundamental frequency by an integer. Otherwise, orthogonality between sub-carriers will be destroyed. In this case, if Fourier transformation is applied, a correct value cannot be obtained.

In particular, if a delay wave is received due to multi-path and the like, as shown in FIG. 4, the data of a wave is delayed and arrives later than the data of a direct wave. Therefore, if Fourier transformation is applied to the shaded part shown in FIG. 4 when subsequent data follows immediately after, inter-symbol interference (ISI) occurs.

In this case, as shown in FIG. 4, if a guard interval is added, a sub-carrier for carrying the guard interval is continuously connected to the end section of data, and the data is expanded by the guard interval, since the guard interval is the copy of the top section of the data of a prescribed length. If the delay wave reaches the receiver within a delay time covered by the length of a guard interval, the Fourier transformation of both the direct and delay waves is performed in one cycle of the fundamental frequency. Therefore, a correct value can be obtained. Since another piece of data follows immediately after the data, there is no inter-symbol interference. Although the result of Fourier transformation of data including the delayed wave includes amplitude change and phase rotation, they are to be predicted and compensated for by channel prediction and channel compensation, respectively.

As described above, by providing a guard interval, the result of Fourier transformation is compensated for and inter-symbol interference can be prevented even if there is a delay.

Figure 5:
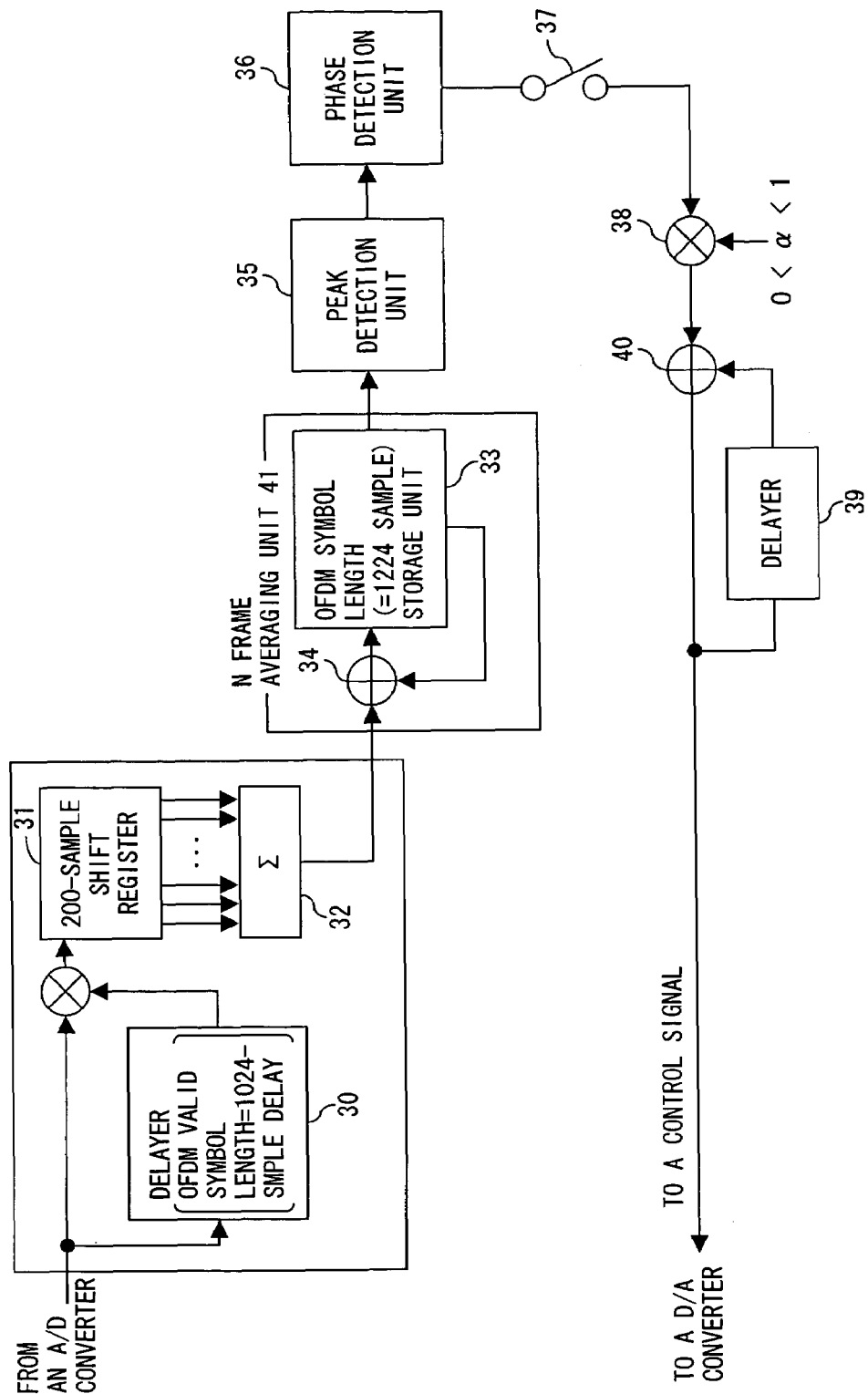
FIG. 5 shows the configuration of an AFC (Automatic Frequency Control) device in the first preferred embodiment of the present invention.

FIG. 5 shows the configuration of an AFC device in the first preferred embodiment of the present invention.

Although with reference to FIG. 1, it is described that the output from the IFFT unit has been converted from digital to analog, in reality, afterwards the frequency of a signal is upconverted into a carrier frequency at an analog signal level. Therefore, an incoming signal must be downconverted by the receiver depending on the carrier frequency and must be converted from analog to digital. This preferred embodiment is used to exercise frequency control through receiver's local oscillator for the purpose of this down-conversion.

Although this preferred embodiment is described presuming an OFDM-CDMA system, the present invention is applicable to any system based on an OFDM system, for example, an OFDM-CDMA system.

In an AFC (Automatic Frequency Control) device, an A/D-converted incoming signal is input to a digital signal processing unit. Therefore, only the digital signal processing unit is described. A delayer 30 delays an input signal in order to adjust the beginning of the symbol of an OFDM system which is composed of a guard interval and data, from which a guard interval is copied, to the guard interval, and multiplies the signal by the original symbol. In this example, it is assumed that one symbol is composed of data of 1,024 samples and a guard interval of 200 samples. Therefore, if data is input in order to make the start point of multiplication between the first 200 samples of one symbol data and the guard interval of 200 samples which is added 1,024 samples back from the head of one symbol coincide, the delayer 30 delays the data by 1,024 samples and multiplies the data by data input later by 1,024 samples.

The results of the multiplication, that is, correlation operation are sequentially stored in a shift register 31 of the length of the guard interval, that is, 200 samples and are added in an adder 32. The result of the addition is input to an N frame averaging unit 41 comprising an OFDM symbol length storage unit 33 and an adder 34.

1,224 samples obtained by adding data and guard intervals, which are sample data for one symbol, are stored in the OFDM symbol length storage unit 33, and noise influences are eliminated by averaging correlation values of symbols sequentially input. Therefore, the N frame averaging unit 41 performs addition for each symbol in a frame composed of 32 symbols and addition of N frames. Therefore, the unit 41 performs 32×N additions in total.

In a peak detection unit 35, peak detection is applied to the correlation value averaged by the N frame averaging unit 41. Then, in a phase detection unit 36, it is detected on which sample a peak position falls, and a control value to be used to correct the frequency deviation of the oscillator of a receiver is output.

The control value is input to a multiplier 38 through a switch 37 every time a peak is detected. In the multiplier 38, the control value is multiplied by α specifying a control step width so that the control value may not suddenly exercise great frequency control over the oscillator. In other words, the value may only gradually exercise frequency control over the oscillator. α is a prescribed value meeting a condition of $0<\alpha<1$.

Thus, the control value obtained by multiplying α is delayed by an adder 40 and a delayer 39 in order to realize a control method of adding the current control value to the previous control value, the current control value is added to the previous control value, and the added value is transmitted as a control signal. The control signal is D/A-converted and is used to control the oscillator.

The present invention realizes frequency stability by averaging the guard interval correlation values in one symbol between frames and increasing an S/N ratio. However, since signals fluctuate due to fading as time elapses when they are received by a mobile terminal, the lower the maximum Doppler frequency that most contributes to this, the less the fading suppression effect by averaging, and the greater the degradation of a receiving characteristic.

Therefore, if the maximum Doppler frequency is low or if an S/N ratio is low, a noise component can be detected as a peak and a phase fluctuation amount with great error can be output since an S/N ratio obtained within an average number of frames can be insufficient. In particular, in the latter case, S/N degradation due to shadowing is assumed. Since a large amount of frequency control is caused by this phenomenon, frequency stability may be reduced at both the time of initial pulling and base-station follow-up.

A stable method that is not affected by noise, for solving this problem by setting a threshold value for an S/N ratio obtained within the average number of frames and not exercising frequency control if the S/N ratio is less than the threshold value, is shown below.

FIG. 6 shows the configuration of an AFC device in the second preferred embodiment of the present invention.

In FIG. 6, the same reference numbers are attached to the same components as those shown in FIG. 5, and their descriptions are omitted.

On receipt of an incoming signal, an A/D converter 46 converts the signal from analog to digital. Then, the delayer 30 delays the signal by 1,024 samples and calculates a correlation value. The values for 200 samples are sequentially stored in the shift register 31, are added in the adder 32, are averaged by the N frame averaging unit 41. Then, the peak of the correlation value is detected by the peak detection unit 35.

This preferred embodiment further comprises a comparator 47 and a multiplier 48. The comparator 47 judges whether the size of a peak detected in the peak detection is larger than the threshold value. This is because the AFC device may not use a peak value less than the threshold value since the size of a peak becomes less than the threshold value if the size of a peak is greatly affected. Therefore, α to be added to a control value output from the phase detection unit 36 is multiplied by a weight k. If the peak value is larger than the threshold value, k is set to a value close to 1 by setting a normal step value, for example, α to 1 ppm and 0.1 ppm at the time of pulling when changing a deviated frequency to a prescribed frequency and at the time of base-station follow-up when being affected by the frequency of the base station, respectively. If the peak value is less than the threshold value, k is set to 0 to stop frequency control.

The control value adjusted thus is converted into analog signals by a D/A converter 49 through a delayer 39 and an adder 40, and is used to control an oscillator 50.

The output of the oscillator 50 is input to a down-conversion processing unit 45 to down-convert the incoming signal.

FIG. 7 shows the configuration of an AFC device in the third preferred embodiment of the present invention.

In this preferred embodiment, a threshold value is set for a phase detection value. Specifically, if a large control value is not expected by nature and nevertheless a phase control value larger than the prescribed value is calculated, the control value is left as it previously was since it can be judged that the value is greatly affected by noise.

In FIG. 7, the same reference numbers are attached to the same components as those shown in FIG. 6, and their descriptions are omitted.

The phase control value detected in the phase detection unit 36 is sent to a comparator 55 and is compared with the phase threshold value. If the phase control value is less than the threshold value, the phase control value is output without modification to exercise the phase control of the oscillator 50. If the phase control value is larger than the threshold value, it can be judged that the value is greatly affected by noise and that the obtained phase control value should not be used. In this case, the phase control value is set to 0. Specifically, for example, in FIG. 7, k is set to 0.

Figure 8:
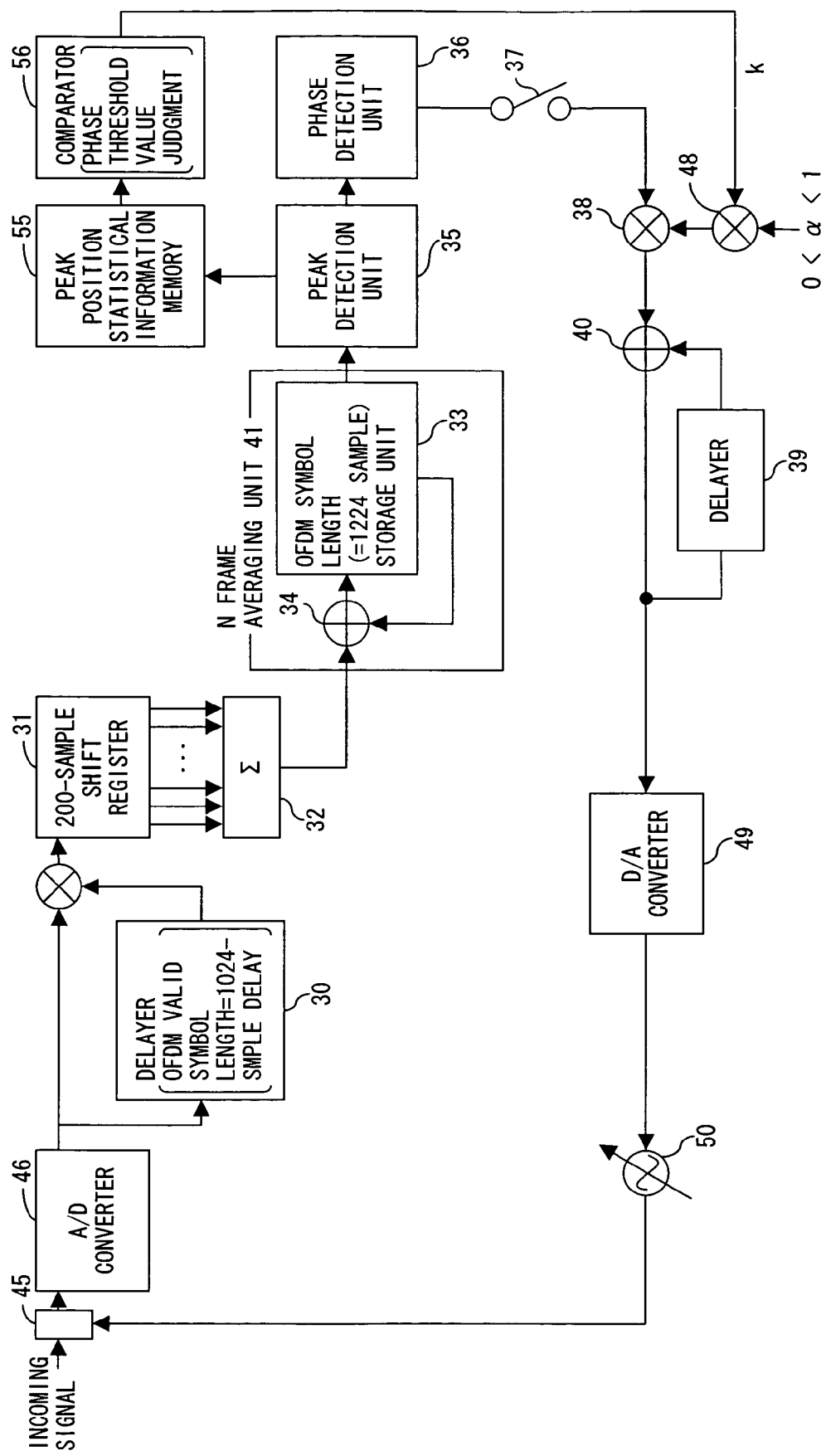
FIG. 8 shows the configuration of an AFC device in the fourth preferred embodiment of the present invention.

FIG. 8 shows the configuration of an AFC device in the fourth preferred embodiment of the present invention.

In FIG. 8, the same reference numbers are attached to the same components as those shown in FIG. 7, and their descriptions are omitted.

This preferred embodiment further comprises a peak position statistical information memory 55 and a comparator (peak position judgment) 56. The peak position statistical information memory 55 stores peak positions sent from the peak detection unit 35 each time and memorizes how many peaks are located at any position. If the peak detection unit 35 judges that the detected peak position is abnormal, based on the statistical information of peak positions stored in the peak position statistical information memory 55, the comparator 56 detects this and prevents the oscillator 50 from being controlled, for example, by setting k to 0 (k=0). This is because it can be judged that the peak position has been greatly affected by noise and the oscillator 50 can be correctly controlled, based on the fact that the peak position is statistically abnormal.

Figure 9:
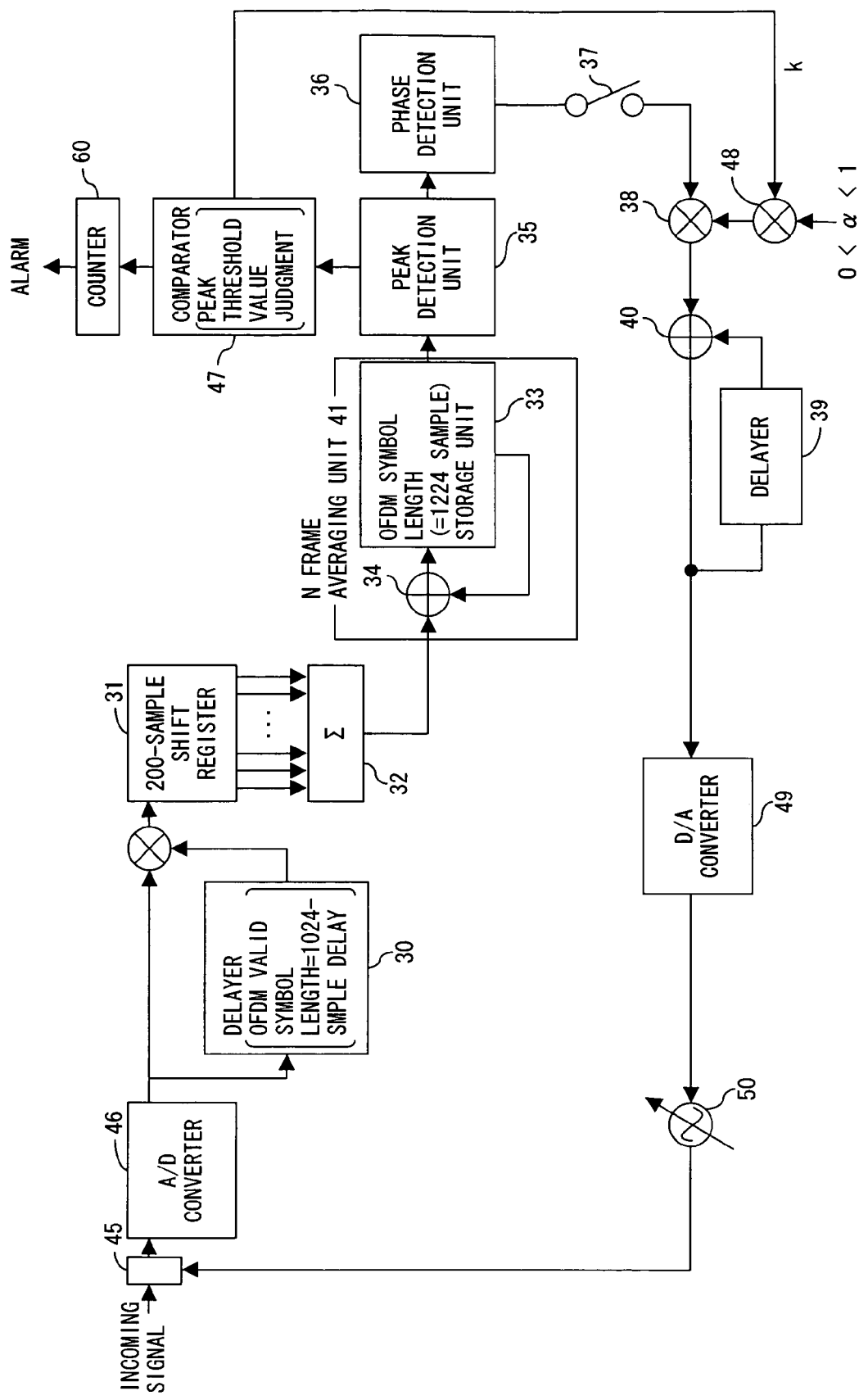
FIG. 9 shows the configuration of an AFC device in the fifth preferred embodiment of the present invention.

FIG. 9 shows the configuration of an AFC device in the fifth preferred embodiment of the present invention.

In FIG. 9, the same reference numbers are attached to the same components as those shown in FIG. 6, and their descriptions are omitted.

In this preferred embodiment, if as a result of the threshold value judgment of a comparator, a peak position with unexpectedly large error is detected, an error signal is sent to a counter 60. Although in FIG. 9 peak threshold values are compared, judging means is not limited to this, and detected phases or peak positions can also be compared. If an error signal is received a prescribed number, the counter 60 judges that the device is unrecoverable and issues an alarm to request a user (higher layer) to reset his/her receiving device.

This is because the device must be reset and synchronized again if the synchronization of the device is completely destroyed due to the failure of a receiver or transmitter.

Figure 10:
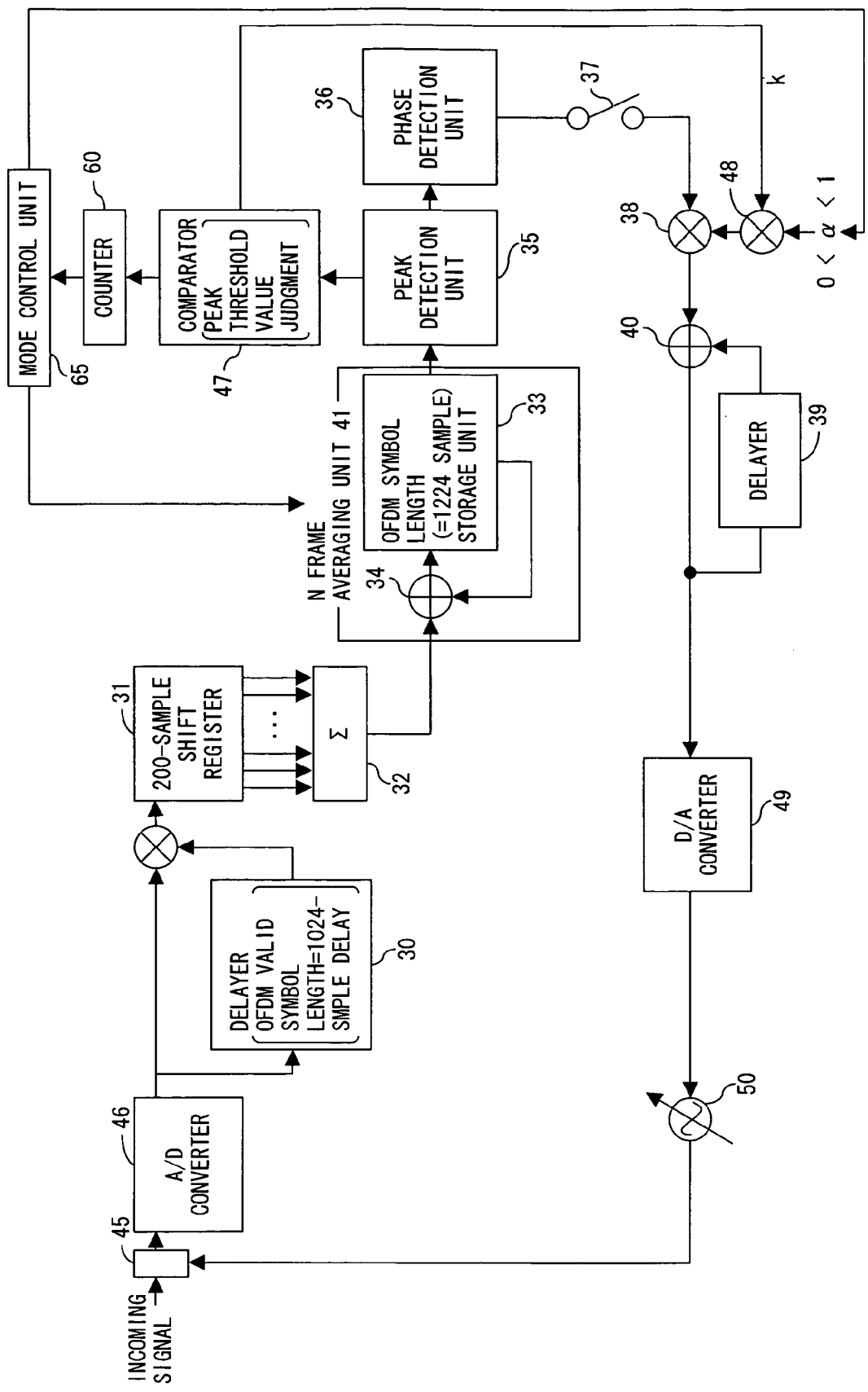
FIG. 10 shows the configuration of an AFC device in the sixth preferred embodiment of the present invention.

FIG. 10 shows the configuration of an AFC device in the sixth preferred embodiment of the present invention.

In FIG. 10, the same reference numbers are attached to the same components as those shown in FIG. 9, and their descriptions are omitted. The judging means is not limited as with FIG. 9.

This preferred embodiment further comprises a mode control unit 65 receiving an alarm signal from the counter 60 and automatically resetting the device or automatically performing a synchronization recovery process. The mode control unit 65 starts a pulling process in order to re-synchronize the device. Specifically, the unit 65 increases value α, which is the control step of a control value for the oscillator 50 (for example, changes from 0.1 ppm to 1 ppm) and an N frame averaging unit 41 decreases the number N of frames to which averaging is applied in order to eliminate noise. Thus, frequency deviation can be rapidly corrected and the frequency can be limited to a desired frequency. Although the pulling process is performed for prescribed hours, an almost desired frequency can be obtained. However, for the reason that a control step is too large or noise elimination is not sufficient, frequency fluctuations become large. Therefore, after the pulling process is performed for prescribed hours, a base-station follow-up process (normal frequency control process) is performed. Specifically, value α is decreased (for example, changed from 1 ppm to 0.1 ppm) or the number of frames to be averaged of the N frame averaging unit 41 is increased. If value α is decreased, the fluctuations become small and large frequency fluctuations can be suppressed. If the number of frames to be averaged is increased, noise influence can be reduced and frequency fluctuations can be suppressed.

Figure 11:
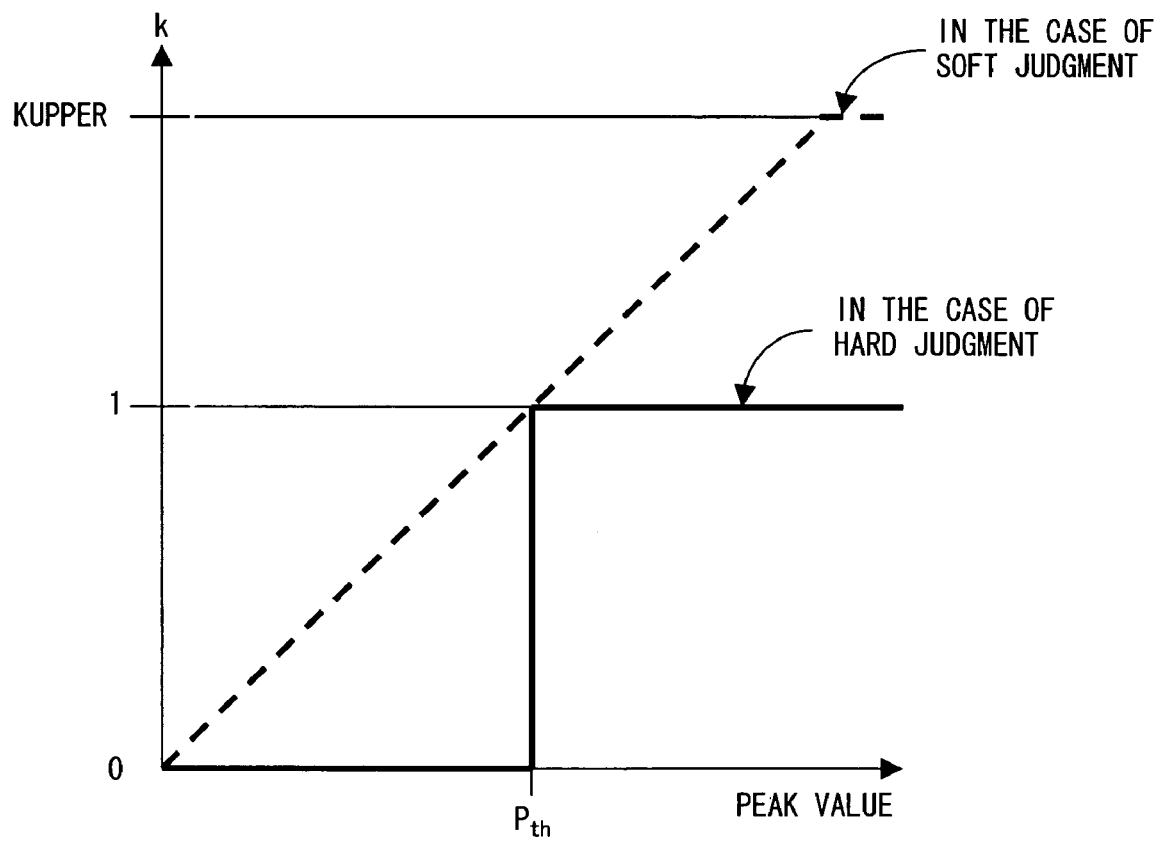
FIG. 11 shows how to judge the threshold value of a peak value and the threshold value of a phase detection value (No. 1).

FIGS. 11 and 12 show how to judge the threshold value of a peak value and that of a phase detection value.

As shown in FIG. 11, in the preferred embodiments described above, if a peak value is greater than the threshold value, k is set to 1 (k=1). If a peak value is less than the threshold value, k is set to 0 (k=0). This is called "hard judgment". However, soft judgment is also applicable. Specifically, an upper limit $k_{upper}$ is set for a value k, and value k can be linearly changed up to the upper limit. Thus, finer control becomes possible. Similarly, FIG. 12 shows the possibility of hard and soft judgment in the case of threshold judgment in a phase detection value, which is the same as with FIG. 11. Therefore, their descriptions are omitted.

However, in this case, Δθ is the absolute value of a detected phase.

FIG. 13 shows selection ranges that can be used for synchronization capture in an OFDM-CDMA system.

In an OFDM-CDMA system, electric waves with the same frequency are transmitted from a plurality of different stations. Therefore, if synchronization capture is applied by the receiver, and the peak of a correlation value is detected as described above, there is a possibility that a plurality of peaks may appear at different positions. However, since all base stations transmit electric waves with the same frequency, frequency setting can be performed using the electric wave of any base station.

Therefore, if there are two peaks as shown in FIGS. 13A and 13B, frequency control can be exercised using the peak correlation value in ranges (1) or (2). This means can be applied to an arbitrary OFDM transmission system using one frequency and is not limited to an OFDM-CDMA system.

Figure 14:
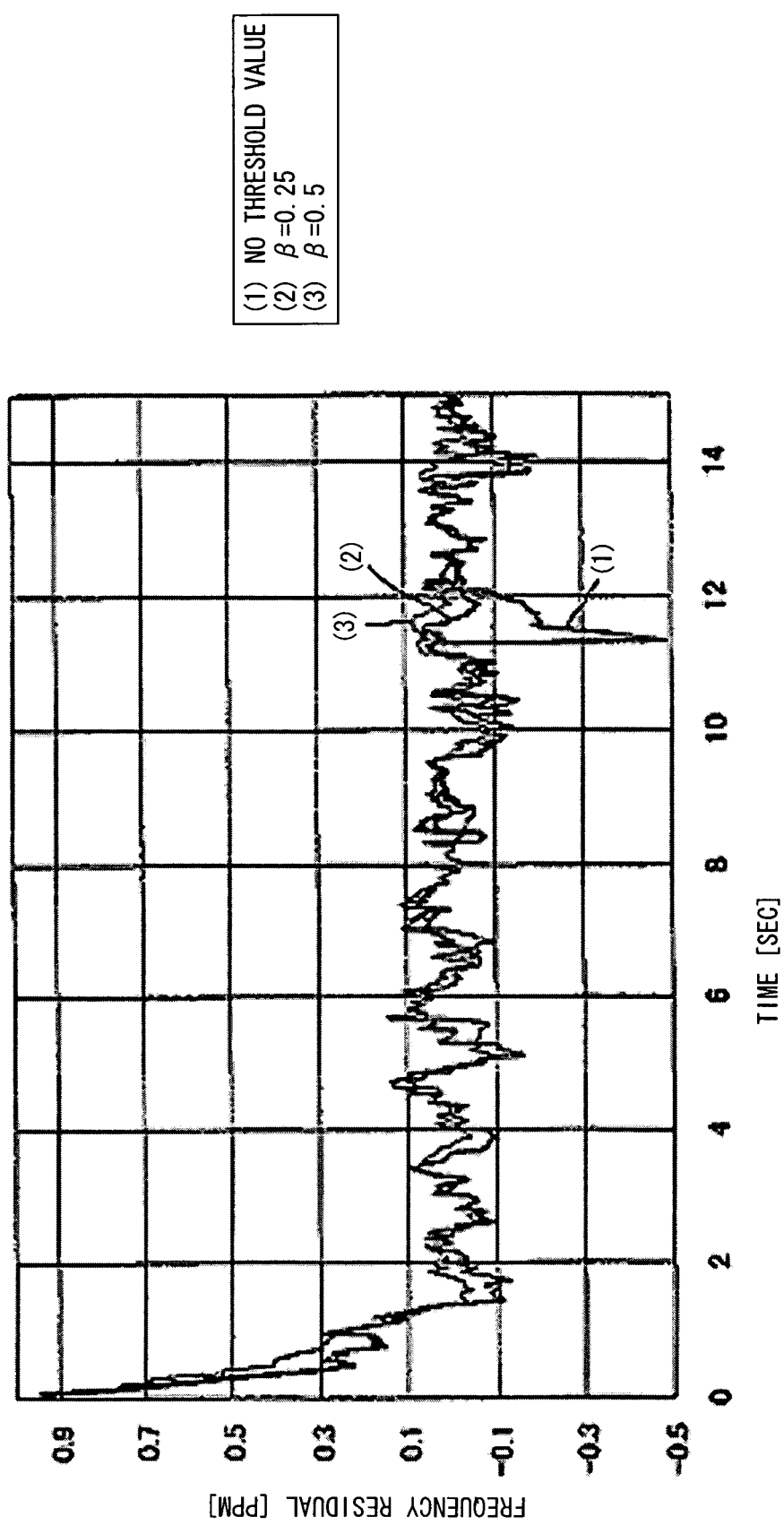
FIG. 14 shows the frequency pulling characteristic in the case where the first preferred embodiment is applied.

FIG. 14 shows the frequency pulling characteristic in the case where the first preferred embodiment is applied.

In FIG. 14, it is assumed that a threshold value for the peak value of a correlation value is $P_{th}$ and that a phase fluctuation amount is as follows.

$$\Delta\theta = \begin{cases} \tan^{-1}\left\{\frac{\text{Im}[\max\{A(j)\}]}{\text{Re}[\max\{A(j)\}]}\right\} & |A(j)|^2 \geq P_{th} \\ 0 & |A(j)|^2 < P_{th} \end{cases}$$

In the equation, A(j) and max {A(j)} are a correlation value and its peak value, respectively. Im and Re are an imaginary number part and a real number part, respectively. Specifically, an incoming signal is assumed to be a complex signal. If the expected mean of peak values is $P_{av}$, threshold value $P_{th}$ is assumed to be as follows:

$$P_{th} = \beta P_{av}$$

FIG. 14 shows the frequency pulling characteristics in the case where β=0.25, where β=0.5 and where no threshold value is used, under the conditions described above. In the case where no threshold value is used, a large frequency residual occurs at the $11^{th}$ to $12^{th}$ second, while when a threshold value is used, there is no such large frequency fluctuation and frequency is stably controlled.

Figure 15:
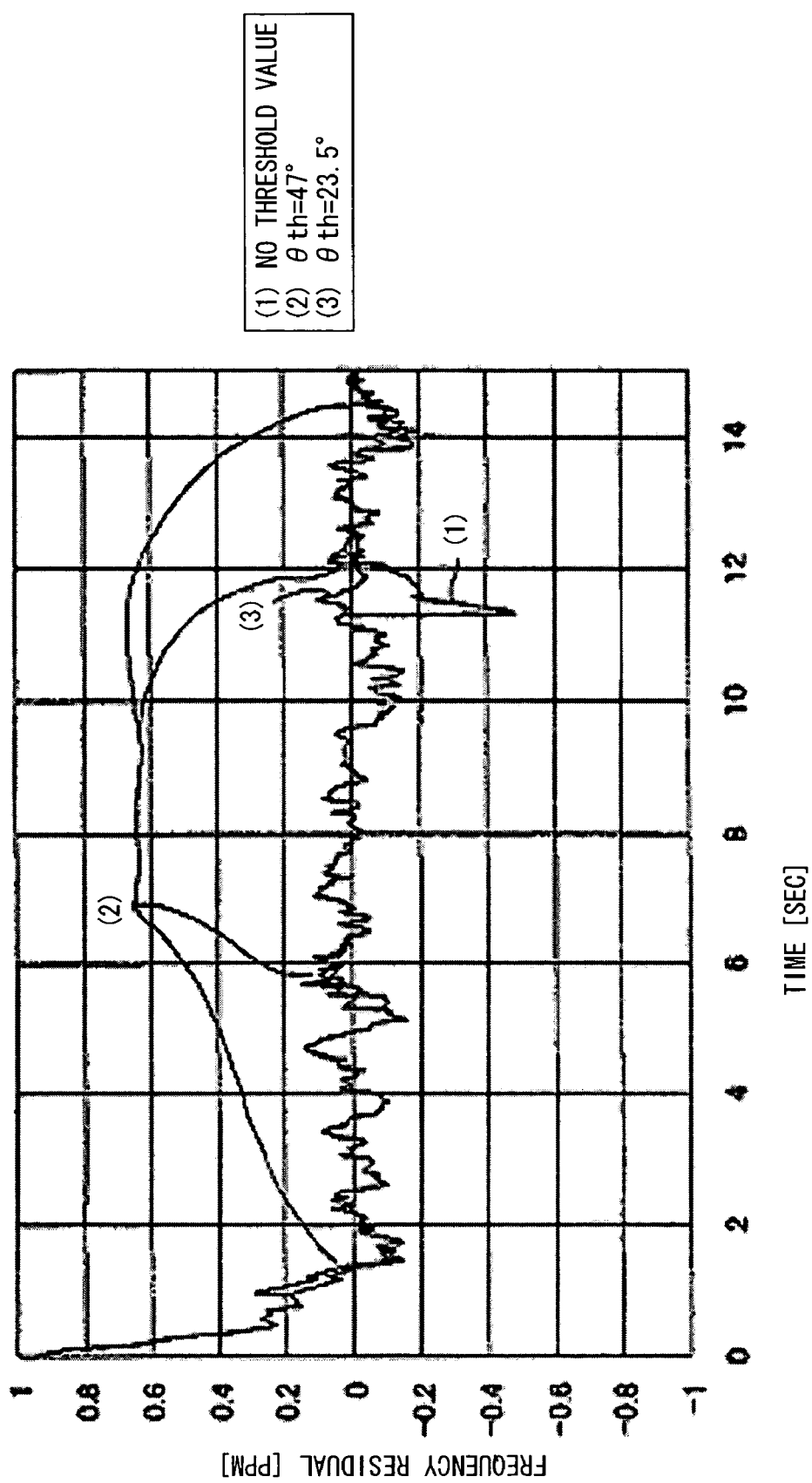
FIG. 15 shows the frequency pulling characteristic in the case where the second preferred embodiment is applied.

FIG. 15 is a graph showing the frequency pulling characteristic in the case where the second preferred embodiment is applied.

In this case, if a threshold value for phase fluctuation amount is $\theta_{th}$, phase fluctuation amount $\Delta\theta$ is as follows:

$$\Delta\theta = \begin{cases} \Delta\theta & \Delta\theta < \theta_{th} \\ 0 & \Delta\theta \geq \theta_{th} \end{cases}$$

In the equation, $\theta_{th}$ is a phase fluctuation amount expected in anticipated frequency stability.

FIG. 15 shows the frequency pulling characteristics in the case where $\theta_{th}=47°$, where $\theta_{th}=23.5°$ and where no threshold value is used. In each case, a large frequency change shown at the 11th to 12th second is suppressed and frequency is stabilized.

According to the present invention, a high-accuracy AFC device can be provided in an OFDM system. In particular, the present invention contributes to the realization of an OFDM-CDMA system, which is considered a strong candidate for the fourth generation mobile communication system.

What is claimed is:

1. An automatic frequency control device in an OFDM (Orthogonal Frequency Divisional Multiplexing) system, comprising:
a correlation unit calculating a correlation value between a guard interval and data of an incoming signal;
an averaging unit averaging correlation values across a plurality of symbols and a plurality of frames;
a peak position detecting unit detecting a peak position of the averaged correlation value; and
a control unit controlling an oscillator using a prescribed step, based on the detected peak position, wherein
if a number of detected peak positions with error greater than expected exceeds a prescribed number, then the number of frames to be averaged and the width of a control step of a correlation value are modified.

2. The automatic frequency control device according to claim 1, wherein if a peak value of the correlation value is less than a prescribed value, the oscillator is not controlled.

3. The automatic frequency control device according to claim 1, wherein if a phase fluctuation amount obtained from the peak position of the correlation value is greater than a prescribed value, a control value of the oscillator is not updated.

4. The automatic frequency control device according to claim 1, wherein if the peak position of the correlation value is judged to be abnormal, based on statistical information of peak positions previously obtained, the oscillator is not controlled.

5. The automatic frequency control device according to claim 1, wherein if the number of detected peak positions with error greater than expected exceeds a prescribed number, an alarm is sent to a user or a higher layer to prompt control of the automatic frequency control device.

6. The automatic frequency control device according to claim 1, wherein the control step based on the peak value of a correlation value smoothly changes against change of the peak value.

7. The automatic frequency control device according to claim 1, wherein the control step based on the phase fluctuation amount obtained from the peak position of a correlation value smoothly changes against change of phase fluctuation amount.

8. The automatic frequency control device according to claim 1, wherein the number of frames to be averaged at the time of initial pulling and that at the time of base-station follow-up are different.

9. The automatic frequency control device according to claim 1, wherein the control step at the time of initial pulling and that at the time of base-station follow-up are different.

10. The automatic frequency control device according to claim 1, which is used in an OFDM-CDMA system.

11. An automatic frequency control method in an OFDM (Orthogonal Frequency Divisional Multiplexing) system, comprising:
calculating a correlation value between a guard interval and data of an incoming signal;
averaging correlation values across a plurality of symbols and a plurality of frames;
detecting a peak position of the averaged correlation value; and
controlling an oscillator using a prescribed step, based on the detected peak position, wherein
if a number of detected peak positions with error greater than expected exceeds a prescribed number, than the number of frames to be averaged and the width of a control step of a correlation value are modified.

12. The automatic frequency control method according to claim 11, wherein if a peak value of the correlation value is less than a prescribed value, the oscillator is not controlled.

13. The automatic frequency control method according to claim 11, wherein if a phase fluctuation amount obtained from the peak position of the correlation value is greater than a prescribed value, a control value of the oscillator is not updated.

14. The automatic frequency control method according to claim 11, wherein if the peak position of the correlation value is judged to be abnormal based on statistical information of peak positions previously obtained, the oscillator is not controlled.

15. The automatic frequency control method according to claim 11, wherein if the number of detected peak positions with error greater than expected exceeds a prescribed number, an alarm is sent to a user or a higher layer to prompt control of the automatic frequency control device.

16. The automatic frequency control device according to claim 11, wherein the control step based on the peak value of a correlation value smoothly changes against change of the peak value.

17. The automatic frequency control device according to claim 11, wherein the control step based on the phase fluctuation amount obtained from the peak position of a correlation value smoothly changes against change of phase fluctuation amount.

18. The automatic frequency control device according to claim 11, wherein the number of frames to be averaged at the time of initial pulling and that at the time of base-station follow-up are different.

19. The automatic frequency control method according to claim 11, wherein the control step at the time of initial pulling and that at the time of base-station follow-up are different.

20. The automatic frequency control method according to claim 11, which is used in an OFDM-CDMA system.

* * * * *